US012671020B2

(12) United States Patent     (10) Patent No.:   US 12,671,020 B2

Yuan et al.     (45) Date of Patent:   Jun. 30, 2026

(54) MANGANESE OXIDE MAGNETIC NANOPARTICLE, PREPARATION METHOD AND APPLICATION THEREOF

(71) Applicant: Chongqing University, Chongqing (CN)

(72) Inventors: Yuan Yuan, Chongqing (CN); Xu Dai, Chongqing (CN); Ruijin Liao, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 19/255,564

(22) Filed: Jun. 30, 2025

(65) Prior Publication Data

US 2026/0024686 A1     Jan. 22, 2026

(51) Int. Cl.
*H01F 1/00*     (2006.01)
*B82Y 40/00*     (2011.01)

(52) U.S. Cl.
CPC ............ *H01F 1/0045* (2013.01); *B82Y 40/00* (2013.01)

(58) Field of Classification Search
CPC ......... H01F 1/34; H01F 1/0045; H01F 1/0054
See application file for complete search history.

(56) References Cited

FOREIGN PATENT DOCUMENTS

CN     115353149 A     11/2022

OTHER PUBLICATIONS

Dinesen, "Magnetocaloric and magnetoresistive properties of La0.67Ca0.33-xSrxMnO3", Risø-PhD-5, Denmark, Aug. 2004.
First Office Action for Chinese Application No. 202410969950.9 issued Nov. 16, 2024.

*Primary Examiner* — Matthew E. Hoban
(74) *Attorney, Agent, or Firm* — Wood, Phillips, Katz, Clark & Mortimer

(57) ABSTRACT

The present invention relates to the technical field of anti-icing materials, and in particular to a manganese ferrite magnetic nanoparticle, preparation method and application thereof. The manganese ferrite magnetic nanoparticle prepared by the present invention is LaxCaySrzMnO3, wherein X=0.1-0.7, Y=0.1-0.35, and Z=0-0.16; and is prepared from the following materials, comprising, in parts by weight: 10-70 parts of lanthanum nitrate, 10-35 parts of calcium nitrate, 2-10 parts of strontium nitrate, and 30-50 parts of manganese nitrate.

4 Claims, 9 Drawing Sheets

MANGANESE OXIDE MAGNETIC NANOPARTICLE, PREPARATION METHOD AND APPLICATION THEREOF

TECHNICAL FIELD

The present invention relates to the technical field of anti-icing materials, and in particular to a manganese oxide magnetic nanoparticle, preparation method and application thereof.

BACKGROUND OF THE INVENTION

Ice accretion on power transmission lines poses a significant threat to the operational safety of electrical power systems. China is among the countries most severely affected by such icing events on power lines. At present, commonly used methods for preventing or mitigating icing on power lines include mechanical methods, natural passive methods, surface modifications of conductors, and thermal methods. Mechanical methods can only partially alleviate the icing events and do not effectively prevent them. Natural passive methods may result in conductor galloping and line faults due to uneven or asynchronous ice shedding. Surface modification methods are generally ineffective against glaze ice. Thermal de-icing methods rely on either external heat sources or the self-heating capability of the conductor to prevent the accumulation of ice and snow or to melt already accumulated ice. Thermal de-icing methods can generally be categorized into three types. The first type involves applying a current to the conductor at a current density higher than normal operating conditions, thereby generating heat to melt accumulated ice. The second type utilizes resistive ferromagnetic wires. The third type involves coating the surface of the conductor with low-Curie-point anti-icing materials. The principle is that these materials, when exposed to ambient temperatures below their Curie temperatures, exhibit strong magnetic induction under the high-intensity alternating magnetic field of the transmission line, thereby generating heat to achieve anti-icing or de-icing. However, existing low-Curie-point anti-icing materials suffer from various drawbacks, including complex preparation procedures, high production costs, and the lack of materials with the desired low Curie temperature.

The Chinese Patent CN105801099A (published on Jul. 27, 2016) discloses a MnZn ferrite material with Curie temperature sensitivity. The material is prepared by multiple grinding and calcination processes using manganese oxide, zinc oxide, molybdenum disulfide powder, nano titanium dioxide, polyethylene glycol, graphene, silica, carbonyl iron powder, cobalt oxide, and Cobalt (III) oxide. However, the material has a complex composition, requires a high-precision preparation process, and exhibits a minimum Curie temperature of approximately 26.8° C., which is close to ambient temperature. As a result, under normal power transmission conditions, the material may undergo magnetic induction heating, thereby potentially increasing the operational burden on transmission conductors at ambient temperature over time. Furthermore, the material is unable to achieve rapid heating at low temperatures required for effective de-icing of conductors.

The Chinese Patent CN117551317A (published on Feb. 13, 2024) discloses a low-Curie-point polymer composite material and preparation method thereof. In this patent, a random copolymer is melted and mixed with fatty alcohols and conductive fillers to form a polymer composite. The anti-icing mechanism relies on the electrothermal effect resulting from the high electrical resistance of the material.

The Chinese Patent CN112552767A (published on Mar. 26, 2021) discloses a low-Curie-point ferromagnetic anti-icing material for a conductor and preparation method thereof. In this patent, specific parts by weight of iron, nickel, silicon, chromium, cerium, and praseodymium-neodymium alloy are melted in a vacuum induction melting furnace. The melt is atomized into a cooling chamber under an argon atmosphere to obtain a gas-atomized powder. The gas-atomized powder is then blended with carbon black, mixed with xylene under high-speed stirring, and further mixed with fluorinated polyacrylate and antioxidants. However, the low-Curie-point material prepared by this patent has a complex composition and high production costs.

In summary, there is an urgent need for a novel method or strategy to prepare a new material with a low Curie temperature and reduced production costs, in order to alleviate the deficiencies of the prior art.

BRIEF SUMMARY OF THE INVENTION

In view of this, the objective of the present invention is to provide a low-Curie-point manganese oxide magnetic nanoparticle coating for use in the anti-icing field, as well as a preparation method thereof, in order to alleviate or partially alleviate the deficiencies of the prior art. The specific technical solutions are provided as follows.

A manganese oxide magnetic nanoparticle, wherein the molecular formula of the manganese oxide magnetic nanoparticle is $La_xCa_ySr_zMnO_3$, wherein x=0.1-0.7, y=0.1-0.35, and z=0-0.16; the manganese oxide magnetic nanoparticle is prepared from the following materials, comprising, in parts by weight: 10-70 parts of lanthanum nitrate, 10-35 parts of calcium nitrate, 2-10 parts of strontium nitrate, and 30-50 parts of manganese nitrate.

Further, the manganese oxide magnetic nanoparticle is prepared from the following materials, comprising, in parts by weight: 30-60 parts of lanthanum nitrate, 10-25 parts of calcium nitrate, 2-5 parts of strontium nitrate, and 30-40 parts of manganese nitrate.

In a preferred embodiment, the manganese oxide magnetic nanoparticle is prepared from the following materials, comprising, in parts by weight: 30 parts of lanthanum nitrate, 10 parts of calcium nitrate, 2 parts of strontium nitrate, and 40 parts of manganese nitrate.

In a preferred embodiment, the molecular formula of the manganese oxide magnetic nanoparticle is $La_xCa_yMnO_3$, wherein X=0.3 and Y=0.1.

Further, a particle size of the manganese oxide magnetic nanoparticle is in the range of 50-300 nm.

Further, the range of the particle size of the manganese oxide magnetic nanoparticle comprises 50-100 nm, 100-150 nm, 150-200 nm, 200-250 nm, or 250-300 nm.

A preparation method for the above-mentioned manganese oxide magnetic nanoparticle, wherein the preparation method is a hydrothermal method performed in a hydrothermal autoclave reactor, comprising the following steps:

S01: adding the following materials in parts by weight into purified water and stirring to obtain a reaction solution: 10-70 parts of lanthanum nitrate, 10-35 parts of calcium nitrate, 2-10 parts of strontium nitrate, and 30-50 parts of manganese nitrate; adjusting pH of the reaction solution to be alkaline, and then subjecting the reaction solution to ultrasonic treatment;

S02: transferring the reaction solution obtained in S01 into the hydrothermal autoclave reactor and heating at a temperature of 200~300° C. for 12~24 hours to obtain a reaction product;

S03: processing the reaction product by drying the reaction product, then annealing at a temperature of 800~1200° C. for 4~24 hours, and grinding to obtain a crude manganese oxide magnetic particle product;

S04: modifying the crude manganese oxide magnetic particle product to obtain the manganese oxide magnetic nanoparticle.

Further, the pH of the reaction solution is adjusted to 8~10 in the S01.

Further, the annealing is carried out at a temperature of 900~1000° C. for 10~15 hours in the S03.

Further, the modification in the S04 comprises modification with oleic acid and/or fluorosilane. Specifically, the crude manganese oxide magnetic particle product may be modified with oleic acid, fluorosilane, or oleic acid followed by fluorosilane.

Further, the modification in the S04 comprises adding the crude manganese oxide magnetic particle product to an oleic acid solution, a fluorosilane solution, or sequentially to an oleic acid solution and a fluorosilane solution and followed by stirring at a temperature of 60~90° C.

In a preferred embodiment, the crude manganese oxide magnetic particle product is co-modified with a 5-25 wt. % oleic acid solution followed by a 3-20 wt. % fluorosilane solution in the S04.

The modification with oleic acid introduces organic functional groups on the surface of the oxide particles, thereby enhancing compatibility with subsequent organic coatings. The further modification with fluorosilane imparts-CF groups to the particles which increase surface hydrophobicity and thereby improve the anti-icing and anti-frosting properties of the nanoparticles.

A method of preparing a low-Curie-point anti-icing coating, comprising incorporating the manganese oxide magnetic nanoparticle into a coating composition.

Beneficial Effects

The present invention utilizes a hydrothermal method to prepare a manganese oxide magnetic nanoparticle with a particle size of approximately 300 nm and a spherical morphology. The manganese oxide magnetic nanoparticle exhibits a low Curie temperature and minimal core loss, making it suitable for the preparation of anti-icing and anti-frosting materials for power transmission conductors. Additionally, the maximum magnetic entropy change of the nanoparticle reaches 1.18 J/kg·K, which compares favorably with reported values in the publicly available literature ranging from 0.64-1.25 J/kg·K, indicating superior heating generation performance.

Furthermore, the manganese oxide magnetic nanoparticle prepared in the present invention is modified with oleic acid, fluorosilane, or oleic acid and fluorosilane. Such modification introduces active functional groups or imparts hydrophobic properties to the surface of the manganese oxide magnetic nanoparticle, enhancing compatibility with subsequent organic coatings and facilitating the preparation of low-Curie-point anti-icing and anti-frosting materials.

Finally, the hydrothermal method utilized in the present invention features operational simplicity, low equipment requirements, and controllable overall cost, making it suitable for large scale industrial production.

As used herein, the term "modifying . . . with oleic acid" or any variant thereof refers to adding the crude manganese oxide magnetic particle product to an oleic acid solution (for example, a 5-25 wt. % oleic acid solution). As used herein, the term "modifying . . . with fluorosilane" or any variant thereof refers to adding the crude manganese oxide magnetic particle product to a fluorosilane solution (for example, a 3-20 wt. % fluorosilane solution in ethanol). As used herein, the term "modifying . . . with oleic acid followed by fluorosilane" or any variant thereof refers to a two-step modification process in which the crude manganese oxide magnetic particle product is first subjected to a first modification by being added to the oleic acid solution, and the resulting first-modified product is then subjected to a second modification by being added to the fluorosilane solution.

BRIEF DESCRIPTION OF DRAWINGS

To make the embodiments of the present invention or the technical solutions in the prior art clearer, the drawings required to be used in the description of the embodiments or the prior art will be briefly introduced below. In all the drawings, similar elements or parts are generally identified by similar reference numerals. The elements or parts in the drawings are not necessarily drawn to scale. It is obvious that the drawings described below are some embodiments of the present invention, and that other drawings can be obtained from these drawings for those of ordinary skill in the art without making inventive effort.

DETAILED DESCRIPTION OF THE INVENTION

Figure 1:
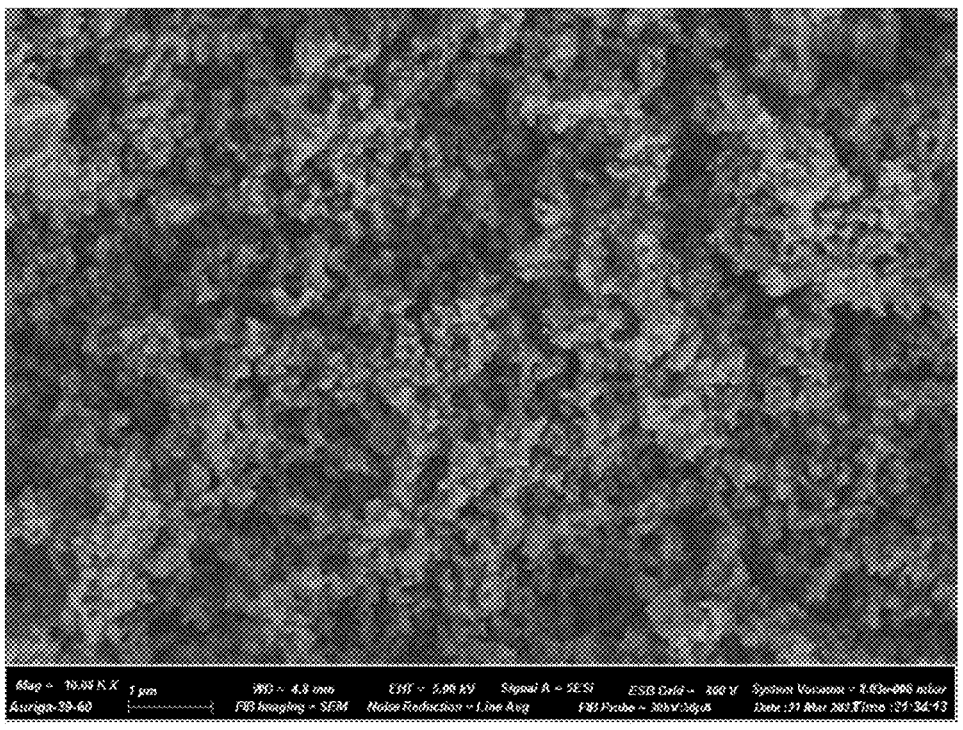
FIG. 1 is an SEM image (scale bar: 1 μm) of the manganese oxide magnetic nanoparticle (without oleic acid modification) prepared in one embodiment of the present invention.

To make the objective, the technical solutions and advantages of the embodiments of the present invention clearer, the technical solutions of the embodiments of the present invention will be clearly and completely described below in combination with drawings. It is obvious that the described embodiments are some of the embodiments of the present invention, not all of the embodiments. Based on the embodiments of the present invention, all other embodiments obtained by those of ordinary skill in the art without making inventive effort shall belong to the protection scope of the present invention.

As used herein, "and/or" includes any and all combinations of one or more of the items listed.

As used herein, "multiple" means two or more, i.e., it includes two, three, four, five, etc.

It should be noted that the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n) . . . " in which an element is defined will not preclude presence of an additional identical element(s) in a process, method, article or device comprising the defined element(s) unless further defined.

As used herein, the term "about", typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Embodiment 1

This embodiment provides an exemplary preparation method for a manganese oxide magnetic nanoparticle.
Preparation Method:
S01: adding the following materials in parts by weight into purified water and stirring for 1 hour to obtain a reaction solution: 30 parts of lanthanum nitrate, 10 parts of calcium nitrate, 2 parts of strontium nitrate, and 40 parts of manganese nitrate; adjusting pH of the reaction solution to 9, and then subjecting the reaction solution to ultrasonic treatment for 1 hour;

S02: transferring the reaction solution obtained in S01 into a hydrothermal autoclave reactor and heating at 270° C. for 24 hours;

S03: drying the reaction product, annealing at 1000° C. for 10 hours, and then grinding to obtain a crude manganese oxide magnetic particle product;

S04: adding the crude manganese oxide magnetic particle product obtained in S03 into an ethanol or methanol solution and stirring to obtain a first product, adding the first product to a 5-25 wt. % oleic acid (OA) solution followed by a 3-20 wt. % fluorosilane (FAS) solution to obtain a mixture, continuing stirring and heating the mixture at 60-90° C. to remove the ethanol or methanol, and then filtering and drying to obtain the manganese oxide magnetic nanoparticle.

Figure 2:
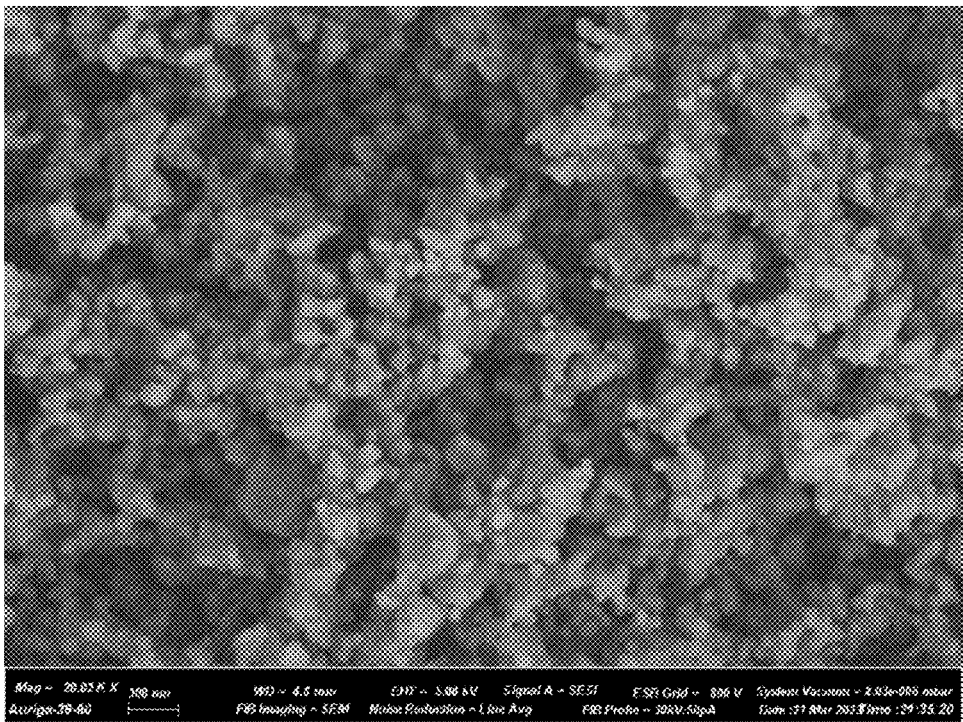
FIG. 2 is an SEM image (scale bar: 300 nm) of the manganese oxide magnetic nanoparticle (with oleic acid modification) prepared in one embodiment of the present invention.
Figure 3:
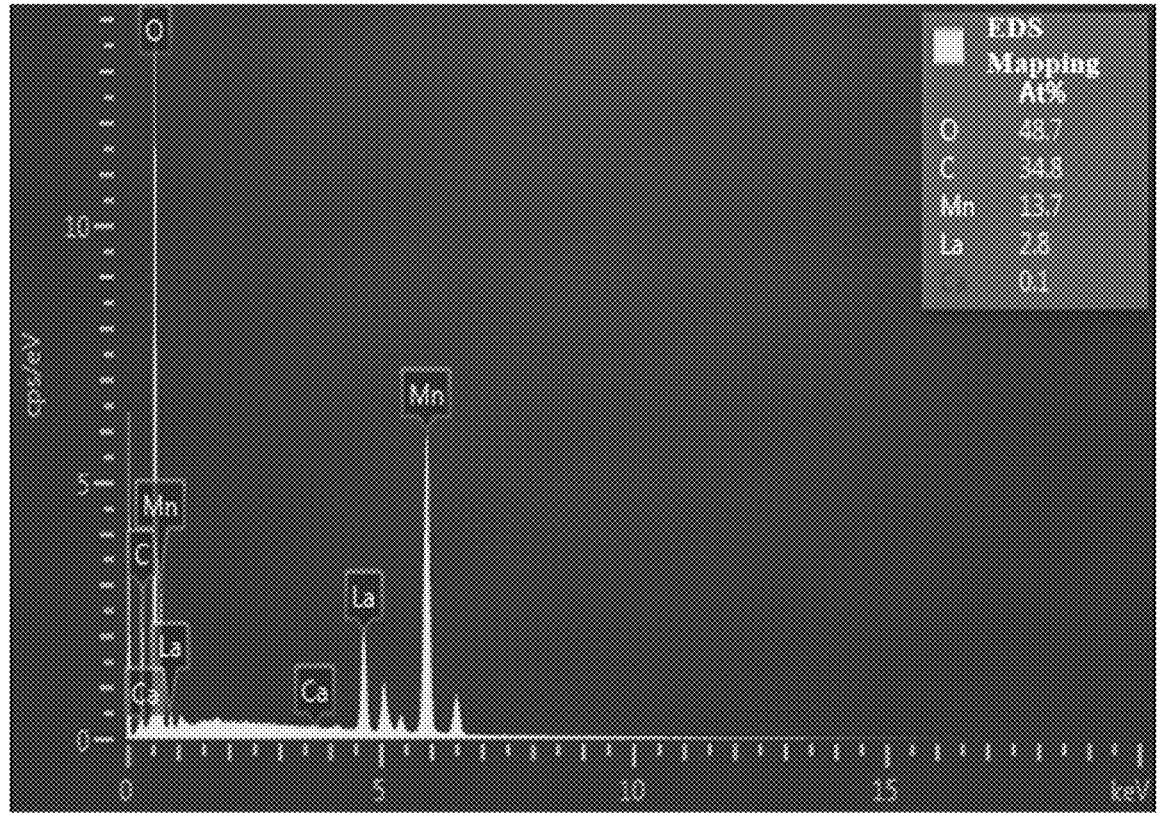
FIG. 3 is an elemental composition analysis diagram of the manganese oxide magnetic nanoparticle prepared in one embodiment of the present invention.

The molecular formula of the manganese oxide magnetic nanoparticle obtained in this embodiment is $La_{0.3}Ca_{0.1}MnO_3$. The crude particles have a particle size of approximately 50 nm. After modification, the particle size is approximately 300 nm. The overall morphology is fine and granular. Morphological characteristics are shown in FIG. 1 and FIG. 2, and elemental composition analysis by energy-dispersive spectroscopy mapping is shown in FIG. 3.

Embodiment 2

This embodiment provides control preparation examples based on the Embodiment 1.

(1) Based on the method described in Embodiment 1, adjusting the material composition and omitting the annealing step results in the formation of rod-like structures only.

TABLE 1

Figure 4:
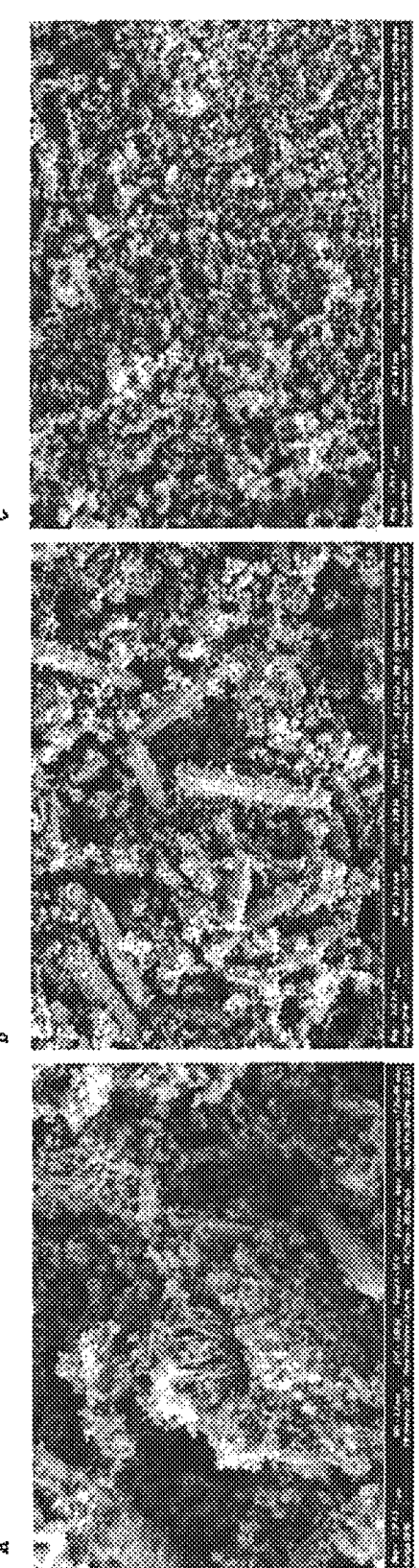
FIG. 4 shows control samples of manganese oxide magnetic nanoparticles prepared in one embodiment of the present invention, where A represents $La_{0.67}Ca_{0.33}MnO_3$, B represents $La_{0.7}Ca_{0.25}Sr_{0.05}MnO_3$, and C represents $La_{0.6}Ca_{0.35}Sr_{0.15}MnO_3$.

| Nanoparticles Prepared Using Different Material Ratios | | | |
| --- | --- | --- | --- |
| Molecular Formula | Material Ratio (by weight) | Morphology | Particle Size |
| $La_{0.67}Ca_{0.33}MnO_3$ | 67 parts of lanthanum nitrate, 33 parts of calcium nitrate, 0 parts of strontium nitrate, 40 parts of manganese nitrate | Primarily granular with a few nanorods (FIG. 4A) | Approximately 50 nm |
| $La_{0.7}Ca_{0.25}Sr_{0.05}MnO_3$ | 70 parts of lanthanum nitrate, 25 parts of calcium nitrate, 5 parts of strontium nitrate, 40 parts of manganese nitrate | Predominantly nanorods (FIG. 4B) | Approximately 600 nm |

TABLE 1-continued

| Molecular Formula | Material Ratio (by weight) | Morphology | Particle Size |
|---|---|---|---|
| | Nanoparticles Prepared Using Different Material Ratios | | |
| $La_{0.6}Ca_{0.35}Sr_{0.15}MnO_3$ | 60 parts of lanthanum nitrate, 35 parts of calcium nitrate, 15 parts of strontium nitrate, 40 parts of manganese nitrate | A few nanorods (FIG. 4C) | Approximately 400 nm |

(2) Based on the method described in Embodiment 1, by adjusting the material ratios and applying different annealing parameters, rod-like and granular structures are obtained.

Figure 5:
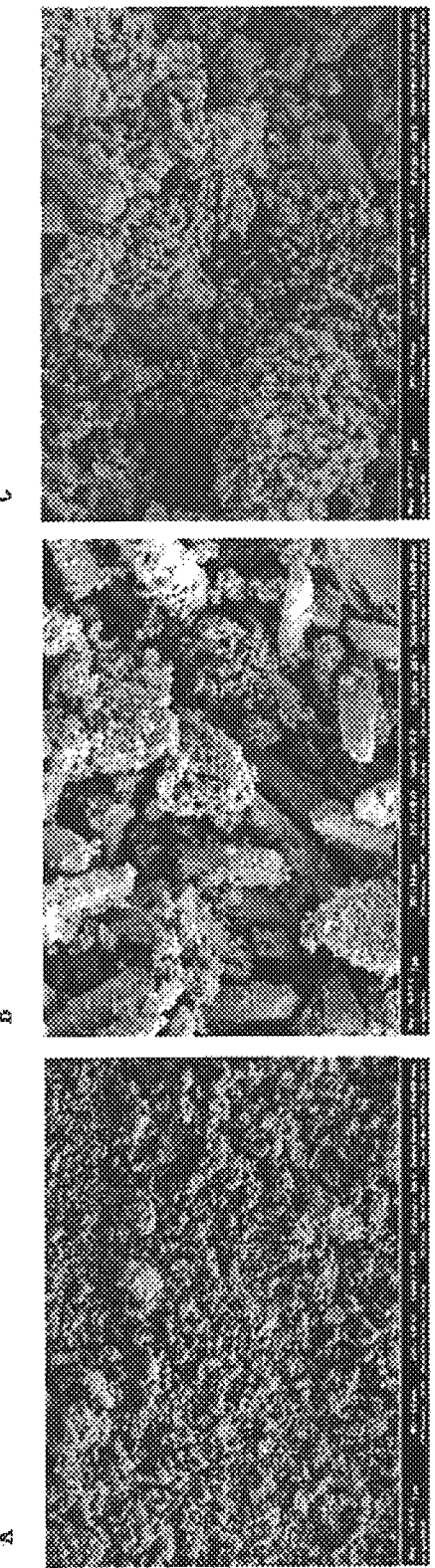
FIG. 5 shows control samples of manganese oxide magnetic nanoparticles prepared in one embodiment of the present invention, where A represents $La_{0.67}Ca_{0.33}MnO_3$, B represents $La_{0.6}Ca_{0.35}MnO_3$, and C represents $La_{0.1}Ca_{0.1}MnO_3$.

| Molecular Formula | Material Ratio (by weight) | Annealing Parameters | Morphology | Particle Size |
|---|---|---|---|---|
| $La_{0.67}Ca_{0.33}MnO_3$ | 67 parts of lanthanum nitrate, 33 parts of calcium nitrate, 0 parts of strontium nitrate, 40 parts of manganese nitrate | 900° C. for 10 h | Primarily cubic particles with a few nanorods and agglomeration (FIG. 5A) | 200-500 nm |
| $La_{0.6}Ca_{0.35}Sr_{0.15}MnO_3$ | 60 parts of lanthanum nitrate, 35 parts of calcium nitrate, 15 parts of strontium nitrate, 40 parts of manganese nitrate | 900° C. for 10 h | Predominantly nanorods (FIG. 5B) | 600-800 nm |
| $La_{0.1}Ca_{0.1}MnO_3$ | 10 parts of lanthanum nitrate, 10 parts of calcium nitrate, 0 parts of strontium nitrate, 40 parts of manganese nitrate | 1000° C. for 10 h | A few nanorods with agglomeration (FIG. 5C) | Approximately 150 nm |

Figure 6:
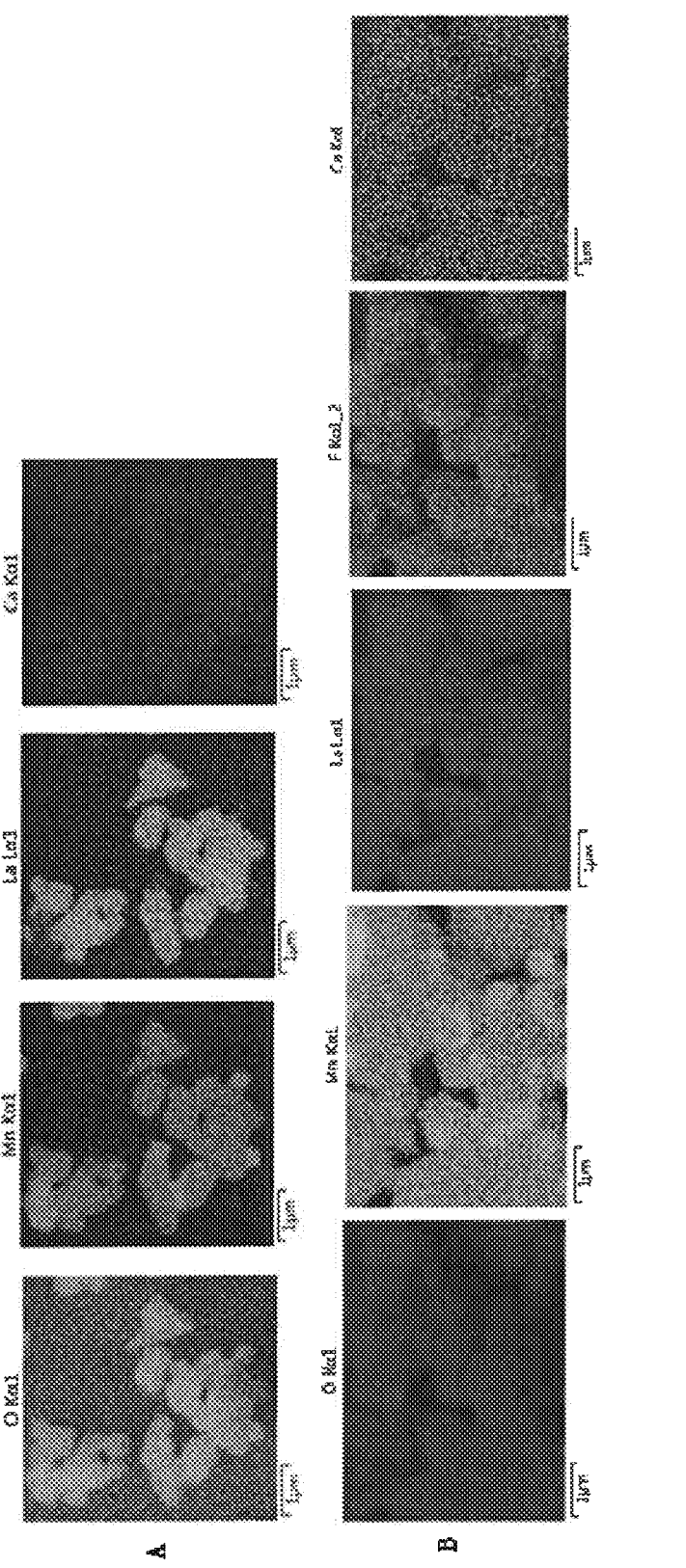
FIG. 6 is an EDS diagram of the manganese oxide magnetic nanoparticle prepared in one embodiment of the present invention using different modification methods, where A represents modification with OA (oleic acid), and B represents modification with OA+FAS (fluorosilane).

(3) Based on the $La_{0.3}Ca_{0.1}MnO_3$ nanoparticles prepared in Embodiment 1, different modification methods are applied, including modification with oleic acid (OA) alone and oleic acid followed by fluorosilane (FAS). As shown in FIG. 6, nanoparticles with a particle size of approximately 300 nm and a fine granular morphology are obtained using both modification methods.

Embodiment 3

This embodiment provides performance validation of the modified manganese oxide magnetic nanoparticle prepared in Embodiment 1.

3.1 Curie Temperature Test

Method: A SQUID-VSM magnetic property measurement system (Quantum Design, USA) is used. The system is based on Superconducting Quantum Interference Device (SQUID) detection technology. By applying DC or AC magnetic fields to the magnetic material, it generates DC (AC) magnetization intensity versus temperature (field strength) curves for the test sample, namely the M-H and M-T curves. A linear fit is performed on the M-T curve, and the temperature point corresponding to the point of maximum slope is identified as the Curie temperature point. The procedure is as follows:

(1) Weigh the mass of the magnetic powder sample.

(2) Load the magnetic powder sample into the sample rod and place the sample rod into the measurement chamber.

(3) Flush the chamber with helium gas (default procedure: flush three times), followed by evacuation.

(4) Set the temperature range (100 K-400 K) and the magnetic field strength (1.5 T); scan the "signal-position" curve to locate the sample.

(5) Apply a DC or AC magnetic field to the magnetic powder sample to obtain DC (AC) magnetization intensity versus temperature (field strength) curves for the test sample, namely the M-T curves. A linear fit is performed on the M-T curve, and the temperature point of maximum slope is identified as the Curie temperature point.

Figure 7:
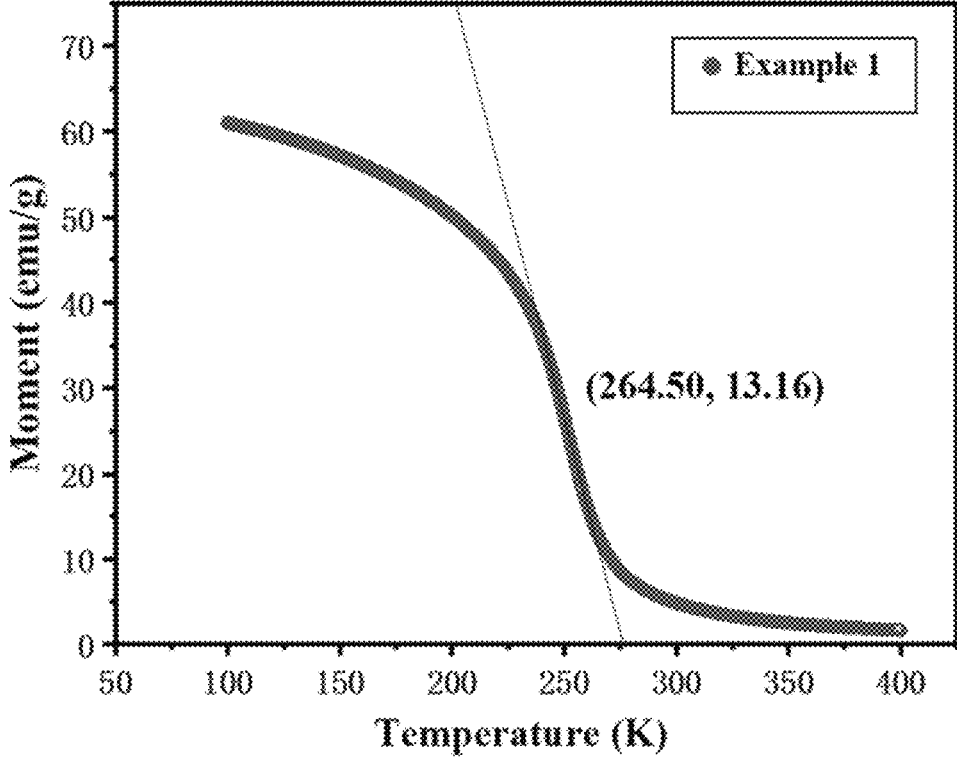
FIG. 7 shows the Curie temperature test results of the manganese oxide magnetic nanoparticle (with oleic acid and fluorosilane modification) prepared in one embodiment of the present invention.

Result: The Curie temperature of $La_{0.3}Ca_{0.1}MnO_3$ nanoparticles modified with oleic acid and fluorosilane is measured to be approximately 264.50 K, corresponding to a low temperature of approximately −8.65° C. This satisfies the requirement for a Curie temperature close to 0° C. See FIG. 7.

Figure 8:
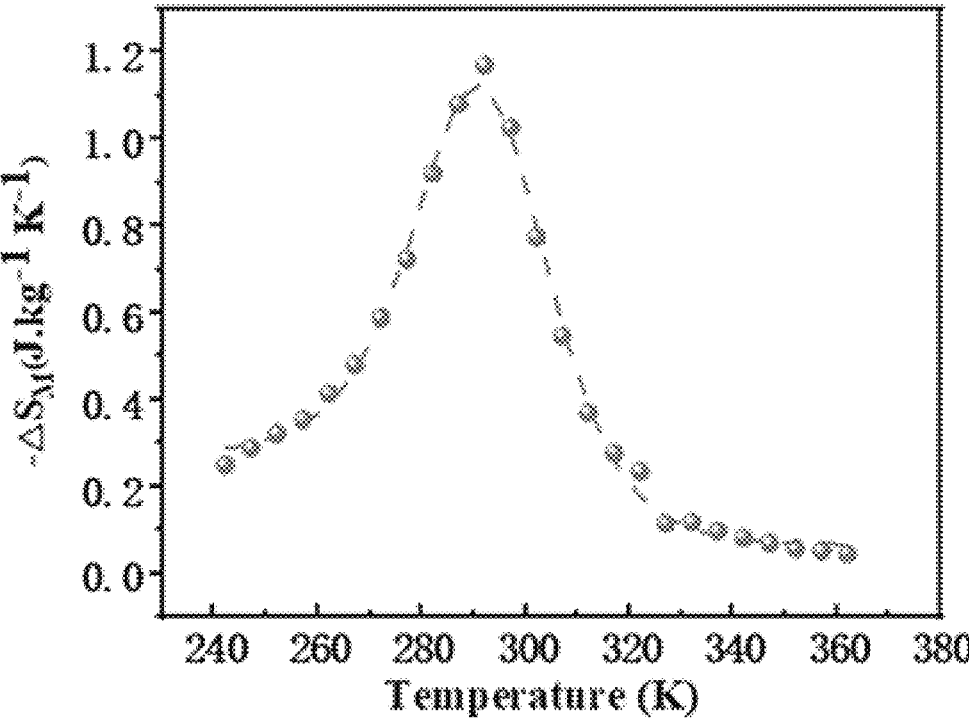
FIG. 8 shows the calculated magnetic entropy change of the manganese oxide magnetic nanoparticle (with oleic acid and fluorosilane modification) prepared in one embodiment of the present invention.

Based on the M-T curve results, the magnetic entropy change at different temperatures is calculated using established formulas referenced from publicly available literature to evaluate the heat generation efficiency. As shown in FIG. 8, the maximum magnetic entropy change near the Curie temperature is 1.18 J/kg·K. This value compares favorably with the reported maximum values in the range of 0.64-1.25 J/kg·K in the publicly available literature, demonstrating superior heat generation performance. The reference publication is *Observation of the magnetic entropy change in Zn doped $MnFe_2O_4$ common ceramic: Be cool being environmental friendly.*

3.2 Thermogravimetric Analysis (TGA)

Method: Thermogravimetric analysis is performed using a TGA analyzer. Under programmed temperature increase (from 0° C. to 1200° C., over the course of one hour), the mass change of the magnetic powder is measured as a function of temperature or time, and corresponding thermal absorption and release are recorded.

Figure 9:
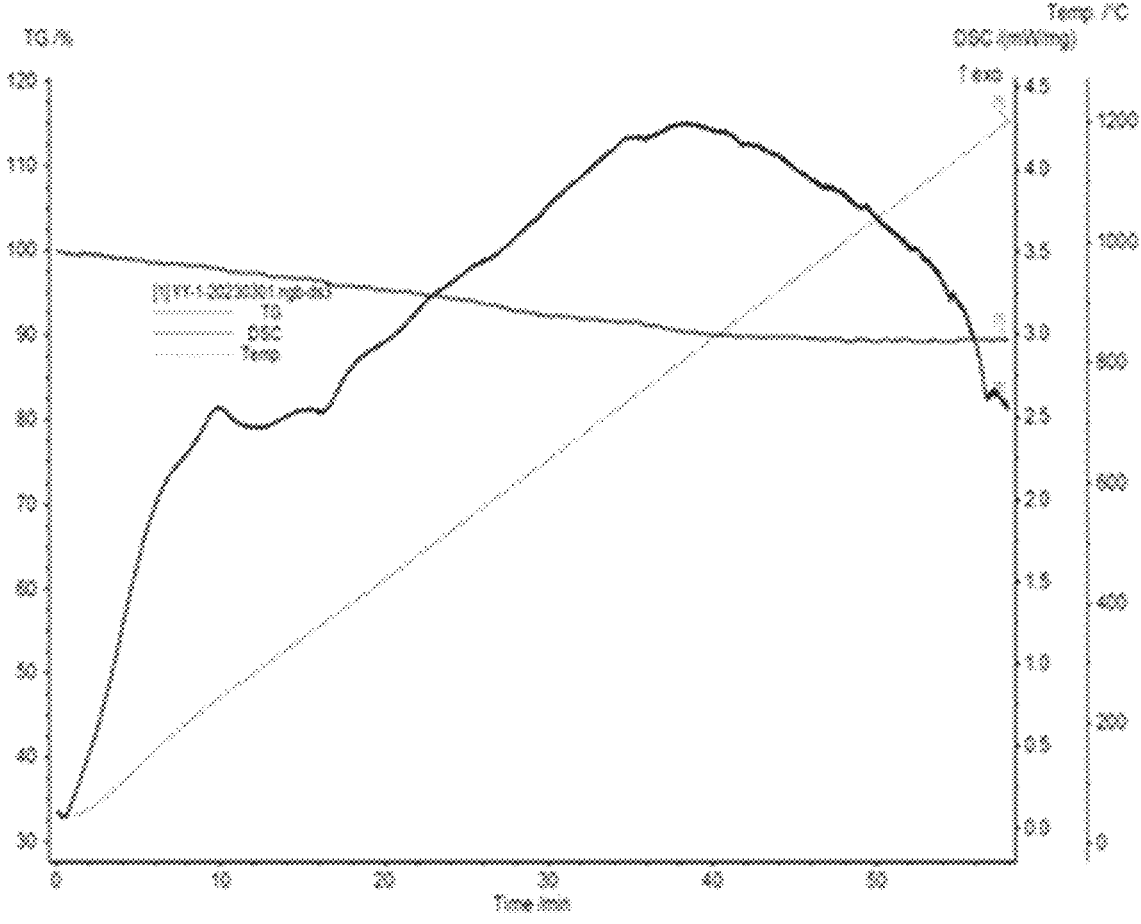
FIG. 9 shows the thermogravimetric analysis results of the manganese oxide magnetic nanoparticle (with oleic acid and fluorosilane modification) prepared in one embodiment of the present invention.

Result: Thermogravimetric analysis of the $La_{0.3}Ca_{0.1}MnO_3$ nanoparticles modified with oleic acid and fluorosilane is conducted, as shown in FIG. 9. The results demonstrate that the nanoparticles maintain mass stability within the temperature range of 800-900° C.

Embodiment 4

This embodiment provides the anti-icing and anti-frosting performance test of the modified manganese oxide magnetic nanoparticle prepared in Embodiment 1.

Method: A semiconductor refrigeration platform (LTD1-350) is used. The sample is placed on the semiconductor refrigeration platform for a frosting experiment conducted at −8° C. The $La_{0.3}Ca_{0.1}MnO_3$ nanoparticles, modified with oleic acid and fluorosilane prepared in Embodiment 1, are mixed with ethanol and coated onto the surface of a superhydrophobic porous structured sample. The sample is placed on a magnet generating a relatively weak magnetic field of 2600 Gauss. The darker region represents the oxidized porous sample coated with the magnetic nanoparticles, while the white region represents the uncoated oxidized porous sample.

Figure 10:
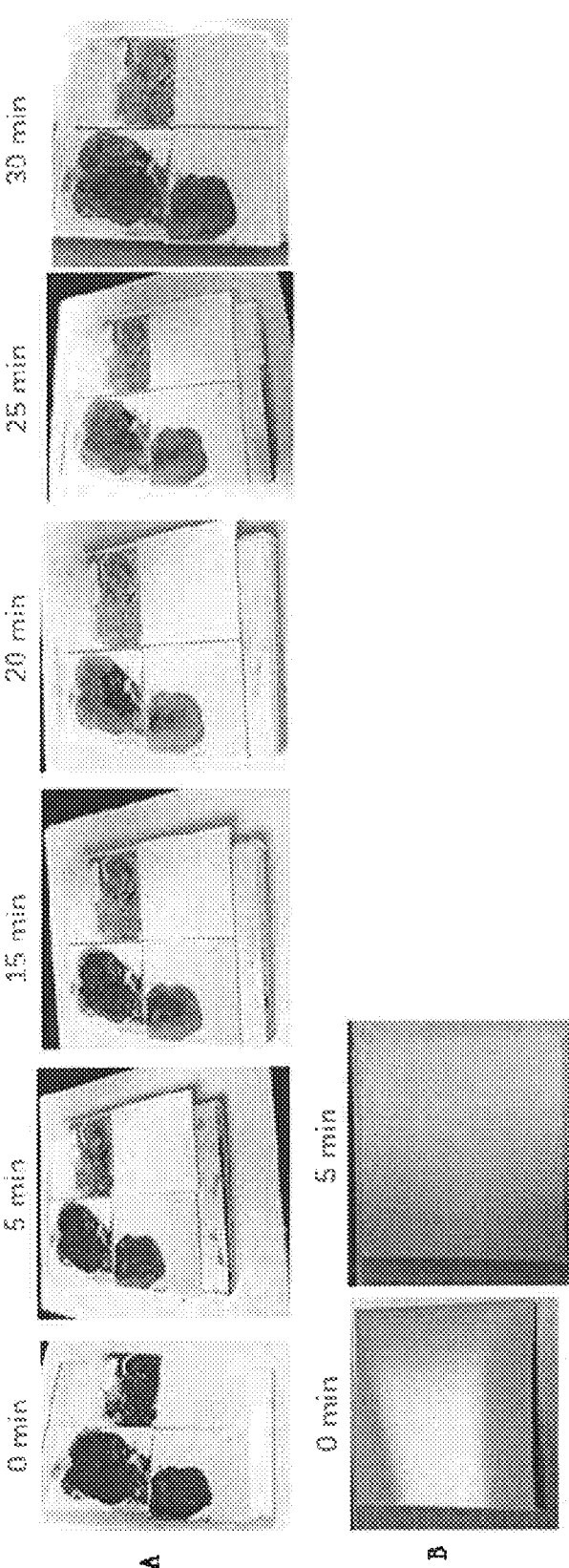
FIG. 10 shows the anti-frosting experiment results of the manganese oxide magnetic nanoparticle prepared in one embodiment of the present invention, where A is the experimental sample, and B is the control sample.

As shown in FIG. 10, over time, the darker region exhibits delayed frost formation, demonstrating the enhanced anti-frosting performance of the superhydrophobic porous structure. The results confirm that the magnetic nanoparticles prepared in the present invention can effectively prevent frosting. In contrast, the uncoated substrate sample becomes fully frosted within 5 minutes, while the sample coated with magnetic nanoparticles exhibits delayed frosting for up to 30 minutes.

It should be understood that the superhydrophobic porous structured sample used in this embodiment may be prepared by any known method disclosed in publicly available literature.

Embodiment 5

This embodiment provides the core loss testing of the modified manganese oxide magnetic nanoparticle prepared in Embodiment 1.

Method: A SQUID-VSM magnetic property measurement system (Quantum Design, USA) is used. The procedure is as follows:
(1) Weigh the mass of the magnetic powder sample.
(2) Load the magnetic powder sample into the sample rod and place the sample rod into the measurement chamber.
(3) Flush the chamber with helium gas (default procedure: flush three times), followed by evacuation.
(4) Set the temperature range (100 K-400 K) and the magnetic field strength (1.5 T); scan the "signal-position" curve to locate the sample.
(5) Apply a DC or AC magnetic field to the magnetic powder sample to obtain DC (AC) magnetization intensity versus temperature (field strength) curves for the test sample, namely M-H curves. For the M-H curves measured at various temperatures, the value of the magnetic field (H) when magnetization (M) equals 0 is calculated. A large absolute value of H indicates high coercivity, which increases susceptibility to heat generation under alternating magnetic fields at room temperature during power transmission, thereby leading to core loss. Conversely, smaller H values or M-H curves closer to the origin indicate lower coercivity and good paramagnetic behavior, resulting in minimal heat generation and low core loss under alternating magnetic fields at room temperature.

Figure 11:
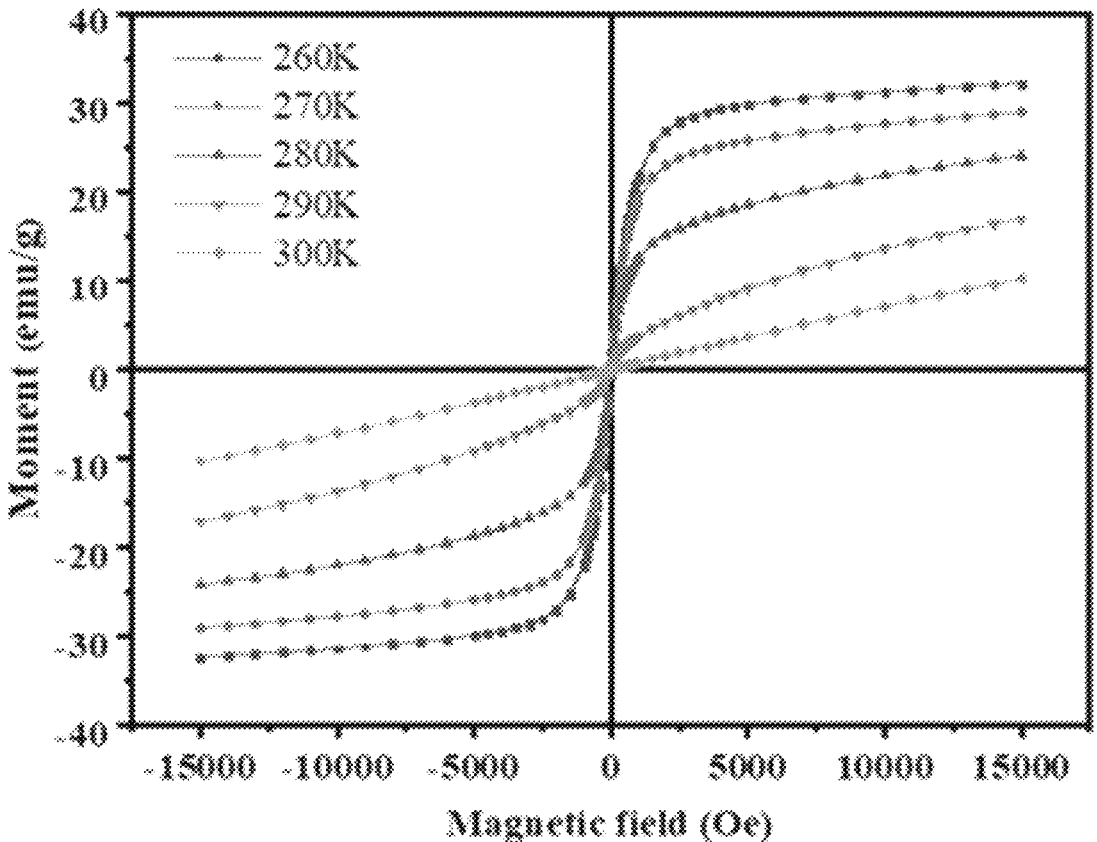
FIG. 11 shows the core loss measurement results of the manganese oxide magnetic nanoparticle prepared in one embodiment of the present invention.

Result: The $La_{0.3}Ca_{0.1}MnO_3$ nanoparticles modified with oleic acid and fluorosilane exhibit coercivity values of 0.4 Oe at all tested temperatures (260 K, 270 K, 280 K, 290 K, and 300 K), with negligible remanent magnetization (close to 0). These results confirm that the nanoparticle is a soft magnetic material and does not cause magnetic hysteresis losses or heat generation under transmission-line operating conditions. Thus, it is suitable for anti-icing or anti-frosting applications in power transmission lines. See FIG. 11.

The embodiments of the present invention are described above with reference to the accompanying drawings, but the present invention is not limited to the aforementioned specific embodiments. The aforementioned embodiments are merely illustrative and not limiting. For those of ordinary skill in the art, many forms can be made under the teaching of present invention without departing from the spirit of the present invention and the scope of the claims, all of which shall fall within the protection scope of the present invention.

What is claimed is:
1. A preparation method for a manganese oxide magnetic nanoparticle, wherein the preparation method is a hydrothermal method performed in a hydrothermal autoclave reactor, comprising:
   S01: adding the following materials in parts by weight into purified water and stirring to obtain a reaction solution: 30-60 parts of lanthanum nitrate, 10-25 parts of calcium nitrate, 2-5 parts of strontium nitrate, and 30-40 parts of manganese nitrate; adjusting pH of the reaction solution to 8-10, and subjecting the reaction solution to ultrasonic treatment;
   S02: transferring the reaction solution obtained in S01 into the hydrothermal autoclave reactor and heating at a temperature of 200-300° C. for 12-24 hours to obtain a reaction product;

S03: processing the reaction product by drying, then annealing at a temperature of 900-1000° C. for 10-15 hours, and grinding to obtain a crude manganese oxide magnetic particle product;

S04: modifying the crude manganese oxide magnetic particle product to obtain the manganese oxide magnetic nanoparticle; wherein the modification comprises a modification with oleic acid and/or fluorosilane; and wherein the manganese oxide magnetic nanoparticle comprises a manganese oxide having a molecular formula of $La_xCa_yMnO_3$, wherein X=0.3, and Y=0.1.

2. The preparation method according to claim 1, wherein the modification in S04 comprises adding the crude manganese oxide magnetic particle product to an oleic acid solution, adding the crude manganese oxide magnetic particle to a fluorosilane solution, or sequentially adding the crude manganese oxide magnetic particle to an oleic acid solution and then to a fluorosilane solution, followed by stirring at a temperature of 60-90° C.

3. The preparation method according to claim 1, wherein the manganese oxide magnetic nanoparticle produced by the modification in S04 has a particle size in the range of 250-300 nm.

4. A method of preparing a low-Curie-point anti-icing coating, comprising incorporating the manganese oxide magnetic nanoparticle prepared by the preparation method according to claim 1 into a coating composition.

* * * * *